Patented Mar. 2, 1937

2,072,529

UNITED STATES PATENT OFFICE 2,072,529

CRAWLER MECHANISM

Emil F. Norelius, Springfield, Ill., assignor to Allis-Chalmers Manufacturing Company, Milwaukee, Wis., a corporation of Delaware Application March 23, 1935, Serial No. 12,534

8 Claims. (Cl. 305—9)

This invention relates to a crawler mechanism for vehicles which operates on the principle of automatically laying down a track for the vehicle, picking up the track after a load bearing truck of the vehicle has passed thereover, and continuing such laying down and picking up of the track in endless succession.

It is an object of the invention to provide an improved mechanism for laying down and picking up a track in the stated manner.

Another object of the invention is to shorten the space required for laying down the track in front of the load bearing elements of the truck, and to shorten the space required for picking up the track behind said load bearing elements.

A further object of the invention is to provide a mechanism in which links of an endless track chain are laid down in a short space in front of the load bearing elements of the truck and are likewise picked up in a short space behind said load bearing elements, and in which said load bearing elements will run smoothly on the track while links of the track chain are being laid down in front of them and picked up behind them.

A still further object of the invention is to provide a mechanism of the indicated type, in which the track chain will run lightly and smoothly with a minimum of slack.

A still further object of the invention is to provide improved means for guiding the track chain.

These and other objects and advantages of the invention will be apparent from the following description. Referring to the drawings accompanying and forming a part of this specification and in which like reference characters designate the same or similar parts in the several views.

Figure 2:
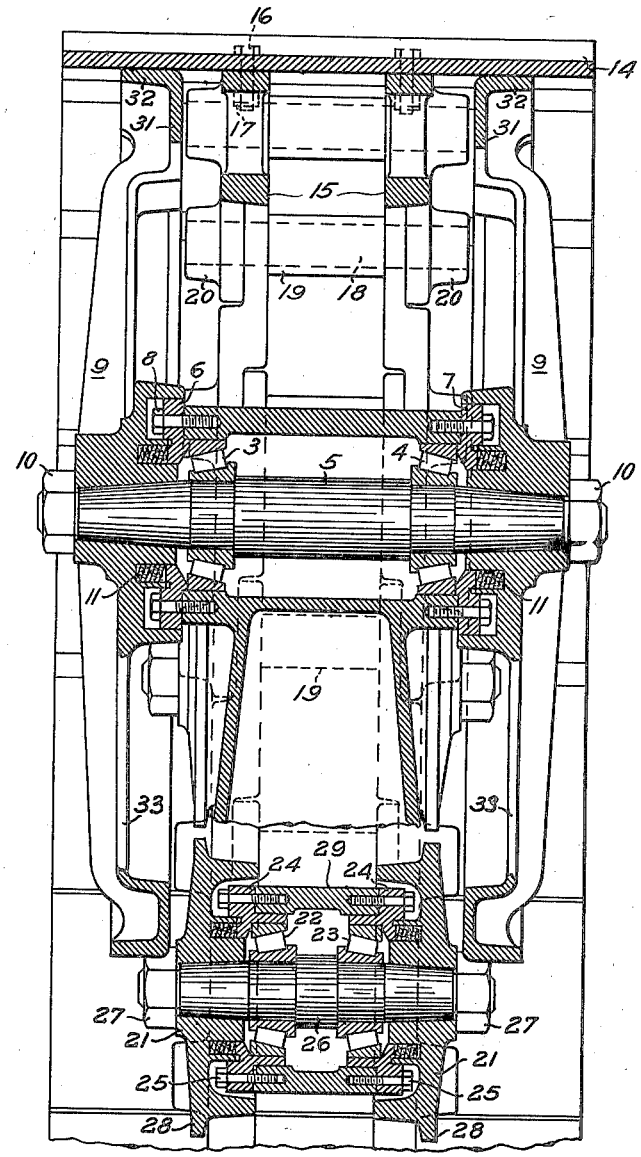
Fig. 2 is a section on line II—II of Fig. 1.

The reference numeral 1 indicates a frame in the form of a substantially hollow casting, a bearing 2 of conventional construction being provided at the center of the frame for pivoting the same on a vehicle. The bearing 2 is a journal bearing and the frame 1, when mounted on a vehicle, may freely oscillate about the axis of the bearing in a vertical plane, the mechanism shown being in this respect similar to others now commonly used on wagons for hauling dirt or other heavy loads. While the mechanism is designed to run in either horizontal direction at right angles to the axis of the bearing 2, it may be assumed for purposes of description and definition that the portion of the mechanism containing the section line II—II be the forward portion, and that the portion at the other side of the bearing be the rearward portion. The forward portion of the frame 1 is fitted with roller bearings 3 and 4, carrying a shaft 5, (Fig. 2). Bearing retainers 6 and 7 for the outer races of the roller bearings 3 and 4 are secured to the frame 1 by bolts 8, as shown in Fig. 2. The shaft 5 carries a pair of end wheels 9, each having a hub portion fitted upon a tapered portion of the shaft 5, the hub portions being retained on the shaft 5 by nuts 10. Suitable packings 11 protect the roller bearings 3 and 4 from dust and other foreign matter.

In the rearward portion of the frame 1 a shaft 12 is rotatably mounted in exactly the same manner as the shaft 5 in the forward portion, and the shaft 12 carries a pair of end wheels 13 which are exactly identical with the end wheels 9 and which are secured to the shaft 12 in the same manner as the end wheels 9 are secured to the shaft 5.

Trained around the pairs of end wheels 9 and 13 is an endless track chain of conventional design, the chain comprising a series of pivotally jointed track links. Each track link consists of a tread plate 14 and a pair of rail members 15 secured to the tread plate 14 by bolts 16 and nuts 17. The rail members of relatively adjacent track links are hinged together, each pair of rail members carrying for this purpose a hinge pin 18 at one end and a bushing 19 at the other end. The portions of the rail members which carry the bushing 19 in one link fit between the portions of the rail members which carry the hinge pin 18 of the adjacent link, as may be seen more clearly in the upper part of Fig. 2. The hinge pin of each track link is mounted in pin bosses 20 formed integrally with the rail members and projecting laterally and outwardly therefrom. The ends of the hinge pin 18 are about flush with the outer faces of the pin bosses 20.

Figure 1:
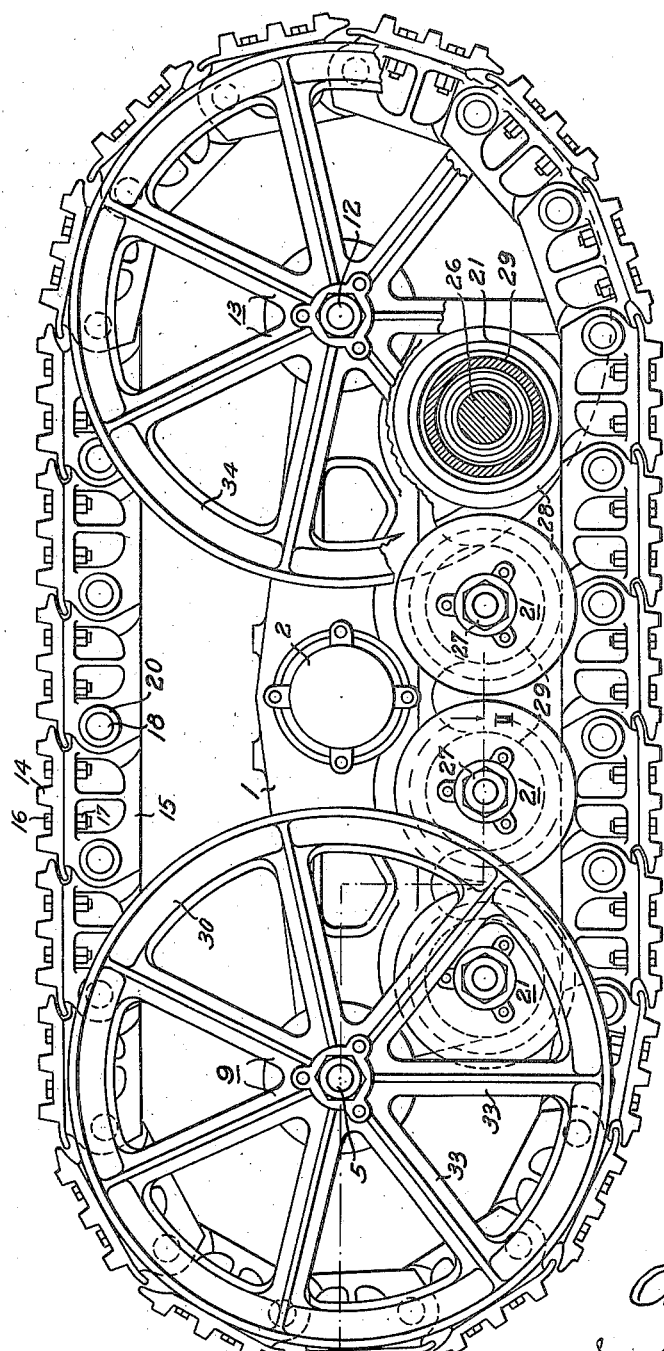
Fig. 1 is a side view, partly in section, of a crawler mechanism embodying the invention.

Referring to Fig. 1 it will be seen that four pairs of rollers 21 bear upon the rail members 15 in the lower run of the track belt. The rollers are rotatably mounted on the frame 1 between a vertical plane through the axis of shaft 5 and a vertical plane through the axis of shaft 12. The pairs of rollers 21 are all alike and each is mounted on the frame 1 in the following manner. Roller bearings 22 and 23 are secured in a suitable downward extension 29 of the frame 1 by means of bearing retainers 24, bolts 25 holding the bearing retainers in place in the downward extension 29 of the frame 1. The roller bearings 22 and 23 carry a shaft 26, and a roller 21 is retained on a tapered seat at each end of the shaft 26 by means of a nut 27. The rollers 21 have suitable flanges 28 for cooperation with the rail members at the outer sides of the rail tops, as will be apparent from Figs. 1 and 2.

It should be noted that the end wheels 9 at the forward end of the frame 1 and the end wheels 13 at the rearward end of the frame are shaped and arranged in a particular manner. Each end wheel 9 has a rim 30 in the form of a circular flange of L-shaped cross-section, one leg 31 of the L extending radially of the axis of rotation of the wheel, and the other leg 32 extending parallel to said axis in the direction from the center of shaft 5 towards the end thereof on which the end wheel is mounted. The end wheels 9 are fixed on the shaft 5 in such a position relative to each other that the relatively opposed surfaces of the legs 31 are spaced from each other in the direction of the axis of shaft 5 for a distance slightly greater than the width of the pairs of rail members in the track chain, measured between the outer end faces of the pin bosses 20. The described shape and relative arrangement of the end wheels 9 permits the pairs of rail members of the track chain to enter between the wheel rims 30 of the end wheels 9, as shown in Figs. 1 and 2, while the tread plates 14 engage the wheel rims radially on the outer peripheral surfaces thereof afforded by the legs 32 of their cross-sections. Transverse displacement of the track belt relative to the end wheels 9 is limited to the slight amount of play which is given the pairs of rail members between the radial portions of the rims 30, that is, between the ring portions afforded by the radial legs 31 of the cross-sections of the wheel rims 30, the relative spacing of these ring portions being, as stated, slightly greater than the over-all width of the pairs of rail members at the pin bosses. The axial spacing between the radial legs 31 of the wheels 9 is substantially wider than the horizontal spacing between vertical planes through the outer edges of the tread surfaces of the rail members 15. It will be seen that the track chain may easily run upon the end wheels 9 and will be securely guided due to the contact which may readily occur between the end surfaces of the pin bosses 20 and the relatively opposed radial surfaces of the wheel rims. Instead of contacting the end surfaces of the pin bosses, the radial surfaces of the wheel rims may contact the ends of the hinge pins in case these should project from the pin bosses, but preferably the ends of the hinge pins are flush with the end surfaces of the pin bosses. The corners of the pin bosses are somewhat rounded according to conventional design and advantage may be taken of this feature for facilitating the entry of the rail members between the wheel rims, by making the ends of the hinge pins flush with the end surfaces of the pin bosses.

The end wheels 13 are shaped and arranged in exactly the same manner as the end wheels 9, and what has been said about the cooperation of the track chain with the end wheels 9 also applies to the cooperation of the track chain with the end wheels 13.

Referring now to the relative arrangement of the end wheels 9 and the rollers 21, particularly the first pair of these rollers next to the axis of shaft 5, the following is to be noted. The first pair of rollers 21 next to the axis of shaft 5 is arranged between the pair of end wheels 9, and the spokes 33 of these wheels are suitably shaped to clear the ends of the shaft 26 carrying these rollers and the nuts 27 on the ends of said shaft. The axial spacing between the wheel rims 30 is sufficient to afford clearance between these rims and the outer surfaces of the pair of rollers between the end wheels 9, as may be seen from Fig. 2. The horizontal distance between the axis of shaft 5 and the axis of the shaft 26 of said first pair of rollers is comparatively short, and shorter than the center distance between adjacent pivotal joints of the track chain. In other words, the distance between the axis of one of the hinge pins 18 and the axis of the next hinge pin 18 is greater than the distance between a vertical plane through the axis of shaft 5 and a vertical plane through the axis of shaft 26 of the first pair of rollers next to shaft 5. A further important feature in the relative arrangement of the end wheels 9 and the first pair of rollers 21 is that the end wheels 9 are raised with respect to the horizontal plane of the upper surfaces of the tread plates in the lower run of the track belt, while the roller unit has the proper spacing from said horizontal plane so that it will bear upon the rail members of a track link so positioned that the upper surface of its tread plate lies in said horizontal plane. The purpose of this arrangement is to make the end wheels 9 properly perform the function of laying down the track links in front of the first pair of rollers 21 and to impose no function upon the end wheels 9 to partake in transmitting the load of the vehicle upon the horizontal run of the track belt, it being intended to leave this function entirely to the first and subsequent roller units 21. Referring to Fig. 1 it will be seen that the end wheels 9 do not bear at or immediately adjacent to a vertical plane through the axis of shaft 5 upon track links, which, during the forward movement of the mechanism, pass from said wheels under the first pair of rollers 21. Fig. 1 shows the first pair of rollers 21 bearing upon a horizontally disposed link of the track chain, and another link immediately ahead of said first pair of rollers in an upwardly inclined position. The tread plate of this upwardly inclined link does not engage the wheel rims 30, and the portions of the wheel rims at and immediately adjacent to a vertical plane through the axis of shaft 5 lie well above the upper surface of the tread plate of the inclined link, as clearly shown in Fig. 1. While the mechanism advances forwardly the forward pair of rollers will smoothly run from the rail members of the horizontal link upon the rail members of the next link immediately ahead of said horizontal link, and while the rollers run upon said next link the latter will gradually change from the inclined position in which it is shown in Fig. 1 to a horizontal position.

The relative arrangement of the rearward end wheels 13 and the last pair of rollers 21 next to the axis of shaft 12 is the same as has been explained in connection with the forward end wheels 9 and the first pairs of rollers 21. That is, the last pair of rollers 21 is arranged between the pair of end wheels 13, and the horizontal distance between the axis of shaft 12 and the axis of the shaft 26 of said last pair of rollers 21 is shorter than the center distance between adjacent pivotal joints of the track chain. In the position of the track chain shown in Fig. 1 the last pair of rollers 21 bears upon the rail members of a horizontally disposed track link, and the next track link immediately behind said horizontal track link occupies an upwardly inclined position. Here again, as at the forward end of the mechanism, the tread plate of the upwardly inclined link does not engage the wheel rims of the end wheels 13, which are indicated by the reference numeral 34, and the wheel rims 34 are spaced from the upper surface of the tread plate of the inclined link. The outline of the wheel rims 34 above the inclined link is shown in dotted lines as the near end wheel 13 at the rear end of the mechanism is partly broken away for purposes of more clearly showing the position of the last pair of rollers 21 on the rail members of the track chain. While the mechanism advances forwardly the inclined link immediately behind the last pair of rollers 21 will ride up on the rearward end wheels 13 and the link under the last pair of rollers 21, which has been shown in horizontal position in Fig. 1 will smoothly leave said rollers and gradually assume an upwardly inclined position, and upon further forward movement of the mechanism said link will ride up on the end wheels 13. It will readily be seen that the end wheels 13 will not bear at and immediately adjacent to a vertical plane through the axis of shaft 12 upon track links passing from under the last pair of rollers 21 upon the end wheels 13, the contact between the wheel rims 34 and the tread plates of the track links being delayed under the conditions represented in Fig. 1 until the tread plates have been moved entirely past the mentioned vertical plane through the axis of shaft 12.

The two pairs of rollers 21 between the mentioned first and last pairs of rollers 21 are shown in Fig. 1 as being mounted on the same level with the latter, but if desired, these intermediate rollers may be mounted on levels somewhat below the levels of the first and last pairs of rollers.

The described arrangement of end wheels 9 and 13 and rollers 21 requires very little slack in the track chain for smooth and light running of the track chain, and it has been found unnecessary to provide a supporting roller for the upper run of the track chain between the end wheels 9 and 13.

As stated, the mechanism is adapted to run in either horizontal direction at right angles to the axis of the bearing 2, and it will function in the same manner which has been described hereinbefore if it is propelled in the direction opposite to the one which has been assumed hereinbefore to be the forward direction. If driven in said opposite direction the end wheels 13 will lay down the links in front of the pair of rollers next to the axis of shaft 12 in the same manner as has been explained in connection with the end wheels 9, and the end wheels 9 will pick up the track behind the pair of rollers 21 next to the axis of shaft 5 in the same manner as has been explained hereinbefore in connection with the end wheels 13. In all of the mentioned cases, that is, irrespective of whether the mechanism travels in a forward or backward direction, and irrespective of whether the intermediate rollers are on the same level with the first and last pair of rollers, as shown, or on a slightly lower level, the track links will ride on the end wheels 9 and 13 in arcs around the axes of the shafts 5 and 12, and the wheels 9 and 13 will not bear upon track links at and immediately adjacent to vertical planes through the axes of shafts 5 and 12.

It should be understood that it is not intended to limit the invention to the exact details of construction herein described for various modifications within the scope of the claims may occur to persons skilled in the art.

It is claimed and desired to secure by Letters Patent:

1. In a crawler mechanism for vehicles, a frame, a wheel structure having a fixed axis of rotation on said frame, a roller unit having a circumferential tread surface and a fixed axis of rotation on said frame in horizontally and vertically spaced relation to said first axis, and a pivotally jointed endless track chain in which the center distances between relatively adjacent pivotal joints are greater than the horizontal spacing between said first and second axes, said wheel structure being circumferentially engaged by said track chain and extending radially to a level below said circumferential tread surface of said roller unit, and said track chain being adapted to pass from said wheel structure into load bearing engagement with said tread surface of said roller unit without being subject to load bearing contact with said wheel structure, at and immediately adjacent to a vertical plane through the axis of rotation of said wheel structure.

2. In a crawler mechanism for vehicles, a frame, a pair of axially spaced wheel rims having a fixed axis of rotation on said frame, a roller unit between the radial planes of said wheel rims and having a fixed axis of rotation on said frame in horizontally and vertically spaced relation to said first axis, and a pivotally jointed endless track chain in which the center distances between relatively adjacent pivotal joints are greater than the horizontal spacing between said first and second axes, each link of said track chain comprising a rail portion for cooperation with a circumferential tread surface of said roller unit and adapted to be received between said axially spaced wheel rims, and a tread plate extending transversely to said rail portion and adapted to circumferentially engage said wheel rims while said rail portion is received therebetween, said wheel rims extending radially to a level below said circumferential tread surface of said roller unit and being free, at and immediately adjacent to a vertical plane through their axis of rotation, from load bearing contact with said track chain.

3. In a crawler mechanism for vehicles, a frame, a wheel structure having a fixed axis of rotation on said frame, a roller unit having a fixed axis of rotation on said frame in horizontally and vertically spaced relation to said first axis, and a pivotally jointed endless track chain in which the center distances between relatively adjacent pivotal joints are greater than the horizontal spacing between said first and second axes, each link of said track chain comprising a rail portion for cooperation with a circumferential tread surface of said roller unit, and a transverse portion having a surface below the load bearing surface of said rail portion and adapted to circumerentially engage said wheel structure, said wheel structure extending radially to a level below said circumferential tread surface of said roller unit and being free, at and immediately adjacent to a vertical plane through its axis of rotation, from load bearing contact with said track chain.

4. In a crawler mechanism for vehicles, a frame, forward and rearward roller units each having a circumferential tread surface and being rotatably mounted on said frame, forward and rearward wheel structures rotatably mounted on said frame forwardly and rearwardly, respectively, of said forward and rearward roller units, and a pivotally jointed endless track chain in which the center distances between relatively adjacent pivotal joints are greater than the horizontal spacings between the axis of each wheel structure and the axis of the roller unit next to said axis, said wheel structures being circumferentially engaged by said track chain and each extending radially to a level below the circumferential tread surface of the roller unit next thereto, and said track chain being adapted to pass from said forward wheel structure into load bearing engagement with the roller unit next thereto without being subject to load bearing contact with said forward wheel structure at and immediately adjacent to a vertical plane through the axis of rotation of said forward wheel structure, and to pass from load bearing engagement with the roller unit next to said rearward wheel structure upon the latter without being subject to load bearing contact with said rearward wheel structure at and immediately adjacent to a vertical plane through the axis of rotation of the latter.

5. In a crawler mechanism for vehicles, a frame, forward and rearward roller units each having a circumferential tread surface and being rotatably mounted on said frame, forward and rearward wheel structures rotatably mounted on said frame forwardly and rearwardly, respectively, of said forward and rearward roller units, and a series of pivotally connected track links forming an endless track chain in which the center distances between relatively adjacent pivots are greater than the horizontal spacing between the axis of each wheel structure and the axis of the roller unit next thereto, the links of said track chain passing over said wheel structures and underneath said roller units, and said wheel structures being so proportioned and arranged with respect to said roller units as to permit passage of said track links from said forward wheel structure into a substantially horizontal position under said forward roller unit without being subject to load bearing contact with forward wheel structure at and immediately adjacent to a vertical plane through the axis of rotation of said forward wheel structure, and to permit passage of said track links from a substantially horizontal position under said rearward roller unit upon said rearward wheel structure without being subject to load bearing contact with said rearward wheel structure at and immediately adjacent to a vertical plane through the axis of rotation of the latter.

6. In a crawler mechanism for vehicles, a frame, a roller unit rotatably mounted on said frame and having axially spaced guide flanges extending radially at opposite ends of said roller unit, circumferential tread surfaces being formed on said roller unit between said guide flanges thereof, an end wheel structure mounted on said frame for rotation about an axis in radially spaced relation to the axis of said roller unit and having axially spaced rim portions, the axial spacing of said rim portions being greater than the axial width of said roller unit between the outer surfaces of said guide flanges, and said rim portions extending radially over said guide flanges in axially spaced relation thereto, an endless track chain comprising rail members cooperating with said tread surfaces of said roller unit and adapted to be guided between said guide flanges of said roller unit, and tread plates extending transversely of said rail members, said rail members being adapted to enter between said axially spaced rim portions of said end wheel structure and having associated therewith laterally projecting portions adapted to contact laterally with said rim portions of said end wheel structure, and said tread plates being adapted to circumferentially engage said rim portions of said end wheel structure while said rail members are received therebetween.

7. In a crawler mechanism for vehicles, a frame, a roller unit rotatably mounted on said frame and having axially spaced guide flanges extending radially at opposite ends of said roller unit, circumferential tread surfaces being formed on said roller unit between said guide flanges thereof, an end wheel structure, comprising axially spaced rim portions, mounted on said frame for rotation about an axis in radially spaced relation to the axis of said roller unit, said roller unit being arranged between said axially spaced rim portions and the shortest distance between the axes of said end wheel structure and roller unit being shorter than the greatest radius of each of said rim portions, an endless track chain comprising rail members cooperating with said tread surfaces of said roller unit and adapted to be guided between said guide flanges of the latter, hinge connections between relatively adjacent links of said track chain, and tread plates extending transversely of said rail members, said rail members being adapted to enter between said axially spaced rim portions of said end wheel structure and having associated therewith laterally projecting elements forming part of said hinge connections and adapted to contact laterally with oppositely disposed surfaces of said rim portions of said end wheel structure, and said tread plates being adapted to circumferentially engage said rim portions of said end wheel structure while said rail members and hinge elements are received therebetween.

8. In a crawler mechanism for vehicles, a frame, a roller unit rotatably mounted on said frame and having axially spaced guide flanges extending radially at opposite ends of said roller unit, circumferential tread surfaces being formed on said roller unit between said guide flanges thereof, an end wheel structure, comprising axially spaced rim portions, mounted on said frame for rotation about an axis in radially spaced relation to the axis of said roller unit, said roller unit being arranged between said axially spaced rim portions and the shortest distance between the axes of said end wheel structure and roller unit being shorter than the greatest radius of each of said rim portions, an endless track chain comprising rail members cooperating with said tread surfaces of said roller unit and adapted to be guided between said guide flanges of the latter, hinge connections between relatively adjacent links of said track chain, and a tread plate extending transversely of said rail members, each pair of rail members having formed thereon laterally projecting pin bosses forming part of said hinge connections and adapted to contact laterally with oppositely disposed surfaces of said rim portions of said end wheel structure, and said tread plates being adapted to circumferentially engage said rim portions of said end wheel structure while said rail members are received therebetween.

EMIL F. NORELIUS.